United States Patent [19]

Engel

[11] Patent Number: 4,937,671
[45] Date of Patent: Jun. 26, 1990

[54] DIGITAL VIDEO BLACK EXPANDER

[75] Inventor: Christopher M. Engel, Arlington Heights, Ill.

[73] Assignee: Zenith Electronics Corporation, Glenview, Ill.

[21] Appl. No.: 290,783

[22] Filed: Dec. 28, 1988

[51] Int. Cl.$^5$ .............................................. H04N 5/57
[52] U.S. Cl. ...................................... 358/169; 358/39
[58] Field of Search .................. 358/169, 168, 39, 160

[56] References Cited

U.S. PATENT DOCUMENTS

| | | | |
|---|---|---|---|
| 4,187,519 | 2/1980 | Vitols et al. | 358/169 |
| 4,204,229 | 5/1980 | Heuze | 358/169 |
| 4,654,710 | 3/1987 | Richard | 358/169 |
| 4,710,805 | 12/1987 | Markle et al. | 358/39 X |

Primary Examiner—James J. Groody
Assistant Examiner—Mark R. Powell

[57] ABSTRACT

A black expander circuit for a digital video signal includes a pair of moving average filters, one sampling pixels on a line basis and another sampling the pixel samples on a field basis to develop a moving digital average. The moving digital average is added to a constant to form a breakpoint value and supplied to a comparator along with the digital video signal. The output of the comparator controls a mutiplexer. The digital video signal is multiplied by a factor, algebraically summed with the breakpoint value and supplied as one input to the multiplexer with the digital video signal being supplied as the other input. The output of the multiplexer comprises a digital video signal that has portions below the breakpoint value expanded.

6 Claims, 1 Drawing Sheet

DIGITAL VIDEO BLACK EXPANDER

BACKGROUND OF THE INVENTION AND PRIOR ART

This invention relates in general to digital television systems and in particular to a black expander for the digital video in such a television system.

In many reproduced televised scenes, the contrast may not be optimum and changing the setting of the receiver "contrast control" setting may not produce any improvement. While the optimum contrast of a particular scene is a matter of subjective judgment, circuits are being constructed to produce scenes of perceived optimum contrast. One prior art television receiver has a circuit for automatically expanding the portion of the video luminance signal that corresponds to grey areas of the picture, to make the picture elements in these areas darker. The resulting improvement in contrast, by expanding the grey areas, is considered to yield a beneficial result. That circuit is an analog implementation and operates by seeking out the blackest portion of the video signal and moving it toward, or fixing it at, the receiver black level. Other video signals between the blackest portion and an arbitrary "breakpoint" are proportionately expanded. Video signals above the breakpoint are not affected.

With the advent of digital television receivers, such analog techniques are not applicable. The present invention is directed to a black expander for a digital television receiver and utilizes moving average filters and comparators to alter the video input/output translation characteristic to enhance or expand signals representative of grey areas to move them toward black level and hence make them appear darker.

OBJECTS OF THE INVENTION

A principal object of the invention is to provide an improved digital television video system.

Another object of the invention is to provide a digital video system having enhanced contrast characteristics.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
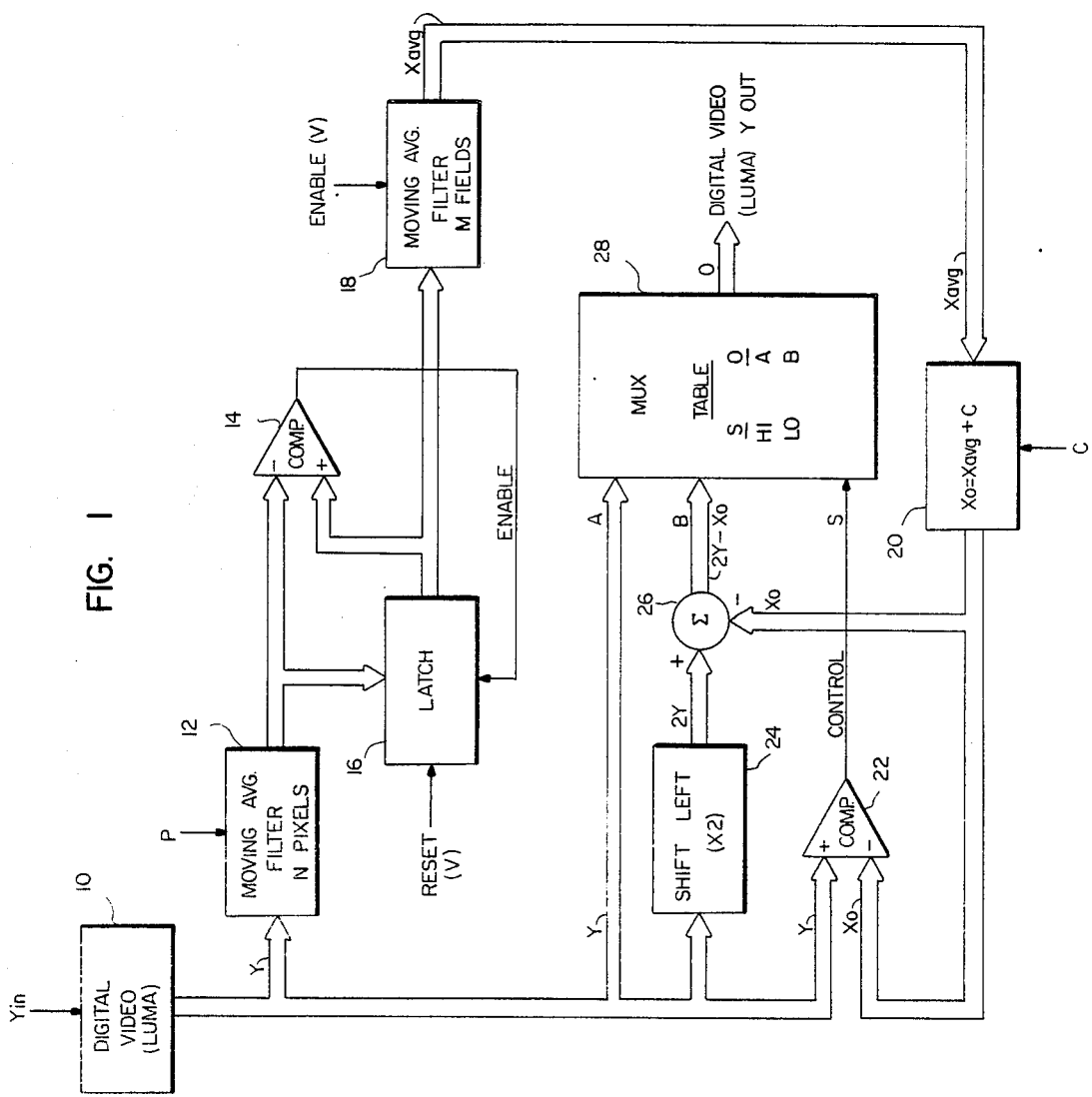
FIG. 1 is a partial block diagram of a black expander constructed in accordance with the invention.

Referring to FIG. 1, a source of digital video (luminance) 10 supplies a digitized Y (or luminance) signal. In accordance with standard digital practice, the Y signal is represented on an eight line bus and is supplied to a moving average filter 12 wherein a fixed number of pixels, during each horizontal line of the input Y signal, are sampled and averaged. The number of pixels may be 30 (out of approximately 900 pixels in a line), although the actual number should not be considered limiting of the invention, because of the subjective nature of the effect, as mentioned above. An input P (programmable control) to moving average filter 12 indicates that the number of sampled pixels is programmable by the user or manufacturer. The output of moving average filter 12 is supplied to the negative input of a comparator 14 and to a latch 16. Latch 16 has an output that is supplied to the positive input of comparator 14 and is, in turn, enabled by the output of comparator 14. As indicated by the connections to the comparator 14, latch 16 is only enabled when the output of moving average filter 12 is more negative than the value that is presently in latch 16. Consequently, latch 16 operates to select the most negative, i.e., the portions of the average signal output produced by moving average filter 12 that are nearest black. Latch 16 is reset to a level corresponding to peak white each field by virtue of the connection of its reset terminal to a source of vertical signal, not shown. The output signal of latch 16 is supplied to another moving average filter 18 which operates on a field basis to develop a moving average of a number of fields of the output of latch 16. This output is called Xav and represents an average of the sampled video level and is supplied to a block 20 where an arbitrary breakpoint value, referred to as Xo, is calculated. The breakpoint, as indicated, is calculated, for example, by taking Xav and adding a constant C to it. Constant C may be negative or positive and, of course, like control input P for filter 12, may be software controlled. The value of Xo should be limited to a certain maximum value. The value of Xav may also be used to obtain C from a look up table, or the like, and the calculation as described should not be considered limiting of the invention.

The output of the breakpoint calculator block 20 is supplied to another comparator 22 and as a negative input to a summation circuit 26. The digital Y signal is supplied to the positive input of comparator 22 where it is compared with the Xo input to develop an output control signal for application to the S (select) input of a multiplexer circuit 28. The digital Y signal is also directly supplied to multiplexer circuit 28 as an A input and to a multiplication circuit 24. Multiplication circuit 24 is indicated as "shift left," which in digital processing results in a multiplication by a factor of two. Its output is therefore indicated as 2Y. The 2Y output is supplied as a positive input to summation circuit 26 where it is algebraically combined with −Xo. The output of summation circuit 26 (2Y−Xo) is applied to multiplexer 28 as a B input.

As indicated by the table shown on multiplexer 28, a high select (S) input results in an output of signal A from multiplexer 28 and a low select input results in an output of signal B. It is thus seen that for signals above the breakpoint Xo, the Y signal is passed by multiplexer 28 without change. For signals below the breakpoint Xo, the output of multiplexer 28 is 10 defined by the equation 2Y−Xo.

Figure 2:
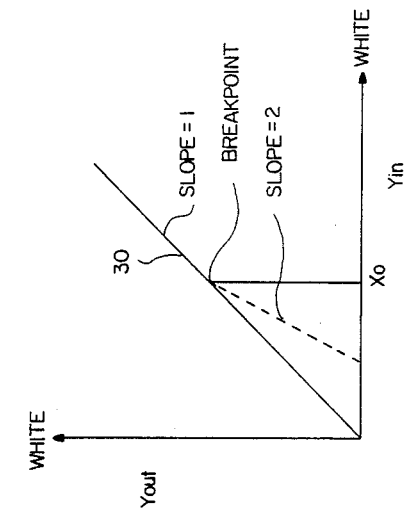
FIG. 2 illustrates the video input and output characteristic for the circuit of FIG. 1.

Referring to FIG. 2, which displays the translation or transfer characteristic of the black expander of the invention, it will be seen that the straight line 30 defines a slope of unity (1) for processing the Y signal. That is, Y signals above the breakpoint are translated with unity gain. As indicated by the dashed line 32, which has a slope of 2, Y input signals below the breakpoint are translated with a gain of 2. Since the origin 0 defines the black level of the Y signal, signals near black, that is grey, but below the breakpoint Xo, are expanded in the direction of black to make them appear blacker. The selection of the number of samples and the rate of updating the moving average are based upon subjective evaluations to a great extent and no fixed criteria are contemplated. Changes or updates in black expansion Xo calculations should not be made so often that noticeable "jerkiness" in the video display results.

It is recognized that numerous modifications and changes in the described embodiment of the invention will be apparent to those skilled in the art without departing from its true spirit and scope. The invention is to be limited only as defined in the claims.

What is claimed is:

1. A method of processing a digitized video signal comprising the steps of:
    digitally sampling said video signal to determine an average of the digitally sampled video, said sampling step comprising developing a moving average of horizontal video samples, and sampling said moving average of horizontal video samples at a field rate to develop a moving average of field rate video samples;
    establishing a breakpoint video level by adding a constant to said moving average of field rate video samples; and
    expanding digital video signals that are below said breakpoint video level to move them closer to black level.

2. The method of claim 1, further including the step of multiplexing said digitized video signal above said breakpoint video level with the expanded digital video signal below said breakpoint video level to form an output digital video signal.

3. A digital video black expander comprising:
    a digital video signal;
    filter means for developing a moving digital average of samples of said digital video signal;
    means for multiplying said digital video signal by a factor;
    means for subtracting said moving digital average from said multiplied digital video signal; and
    means for multiplexing portions of said digital video signal above said moving digital average with the result of said subtraction to form an output digital video signal.

4. The expander of claim 3 wherein said filter means samples of fixed number of pixels in each horizontal line of said digital video signal, and further including;
    comparator means coupled to said filter means;
    latch means coupled to said filter means and to said comparator means, said latch means being enabled by said comparator means to store the lowest value of output produced by said filter means; and
    additional moving average filter means coupled to the output of said latch means for developing said moving digital average based upon a number of samples of said samples of a fixed number of pixels taken at a field rate.

5. The expander of claim 4, further including comparator means for controlling operation of said multiplexing means based upon the magnitudes of said digital video signal and said moving digital average.

6. The expander of claim 5 wherein said moving digital average is supplemented by a constant.

* * * * *